(12) United States Patent
Sarkar et al.

(10) Patent No.: US 9,965,308 B2
(45) Date of Patent: May 8, 2018

(54) AUTOMATIC CREATION OF AFFINITY-TYPE RULES FOR RESOURCES IN DISTRIBUTED COMPUTER SYSTEMS

(71) Applicant: VMware, Inc., Palo Alto, CA (US)

(72) Inventors: Prasenjit Sarkar, Singapore (SG); Vineet Kumar Sinha, Bangalore (IN); Anne Holler, Los Altos, CA (US)

(73) Assignee: VMware, Inc., Seattle, WA (US)

( * ) Notice: Subject to any disclaimer, the term of this patent is extended or adjusted under 35 U.S.C. 154(b) by 266 days.

(21) Appl. No.: 14/575,997

(22) Filed: Dec. 18, 2014

(65) Prior Publication Data

US 2016/0182403 A1    Jun. 23, 2016

(51) Int. Cl.
| | |
|---|---|
| *G06F 15/16* | (2006.01) |
| *G06F 9/455* | (2018.01) |
| *H04L 12/24* | (2006.01) |
| *H04L 29/08* | (2006.01) |

(52) U.S. Cl.
CPC ...... *G06F 9/45558* (2013.01); *H04L 41/0886* (2013.01); *H04L 41/0893* (2013.01); *G06F 2009/45595* (2013.01); *H04L 41/0896* (2013.01); *H04L 41/12* (2013.01); *H04L 67/1021* (2013.01)

(58) Field of Classification Search
CPC .. G06F 9/50; G06F 2009/4557; G06F 9/5061; G06F 9/5044; H04L 63/104
See application file for complete search history.

(56) References Cited

U.S. PATENT DOCUMENTS

| | | | |
|---|---|---|---|
| 9,262,144 B1* | 2/2016 | Apte | G06F 8/60 |
| 2011/0213911 A1* | 9/2011 | Eidus | G06F 9/5033 711/6 |
| 2012/0089981 A1* | 4/2012 | Tripathi | G06F 9/4818 718/1 |
| 2015/0261578 A1* | 9/2015 | Greden | G06F 9/5044 718/1 |
| 2016/0103698 A1* | 4/2016 | Yang | G06F 11/202 714/4.11 |

* cited by examiner

*Primary Examiner* — Brian J Gillis
*Assistant Examiner* — Kamran Mohammadi
(74) *Attorney, Agent, or Firm* — Thomas | Horstemeyer, LLP

(57) ABSTRACT

A resource management system and method for automatically creating affinity-type rules for resource management in a distributed computer system uses association inference information for at least one resource to determine resource association between resources, which is used to automatically create an affinity-type rule for the resources. The affinity-type rule is considered when executing a resource management operation.

20 Claims, 5 Drawing Sheets

AUTOMATIC CREATION OF AFFINITY-TYPE RULES FOR RESOURCES IN DISTRIBUTED COMPUTER SYSTEMS

BACKGROUND

Sharing resources in a networked computer system, such as processors, computer memories, network bandwidth and data storage facilities, among clients, e.g., virtual machines (VMs), running on the system can increase efficiency by reducing maintenance and operating costs, allowing flexibility with respect to individual resource usage, and simplifying resource management. With respect to shared storage, the benefits include data consolidation, universal access to data, ease of storage management, and support for live migration of virtualized environments. Thus, efficiently and effectively managing the shared resources for the clients running in the networked computer system is an important task to ensure that the clients are operating at their desired levels.

In some conventional virtualized infrastructures, an administrator is allowed to specify affinity-type rules for various resources. As an example, a client-client affinity rule ensures that all clients in a specified group will be placed on the same host computer. As another example, a client-client anti-affinity rule ensures that clients in a specified group will be placed on different host computers so that no two clients are placed on the same host computer. As another example, a client-host affinity rule ensures that specified clients are only placed in specified host computers. As another example, a client-host anti-affinity rule ensures that specified clients are never placed in any of specified host computers. However, since there can be hundreds or even thousands of clients running in some virtualized infrastructures, manually creating affinity-type rules for some of these clients can be overwhelming. In addition, since conditions or situations may change over time, established affinity-type rules may need to be repeatedly modified in response to changes in conditions or situations, which may require significant amount of manual operations.

SUMMARY

A resource management system and method for automatically creating affinity-type rules for resource management in a distributed computer system uses association inference information for at least one resource to determine resource association between resources, which is used to automatically create an affinity-type rule for the resources. The affinity-type rule is considered when executing a resource management operation.

A method for automatically creating affinity-type rules for resource management in a distributed computer system in accordance with an embodiment of the invention comprises receiving association inference information for at least one resource, determining resource association between the at least one resource and at least one other resource in the distributed computer system based on the received association inference information, automatically creating an affinity-type rule for the at least one resource and at least one other resource using the determined resource association, and executing a resource management operation with consideration of the affinity-type rule for the at least one resource and the at least one other resource. In some embodiments, the steps of this method are performed when program instructions contained in a computer-readable storage medium are executed by one or more processors.

A resource management system supported by hardware in a distributed computer system in accordance with an embodiment of the invention comprises a rule creation unit and a resource management module. The rule creation unit is configured to receive association inference information for at least one resource and to determine resource association between the at least one resource and at least one other resource based on the received association inference information. In addition, the rule creation unit is further configured to automatically create an affinity-type rule for the at least one resource and at least one other resource using the determined resource association. The resource management module is configured to execute a resource management operation with consideration of the affinity-type rule for the at least one resource and at least one other resource.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
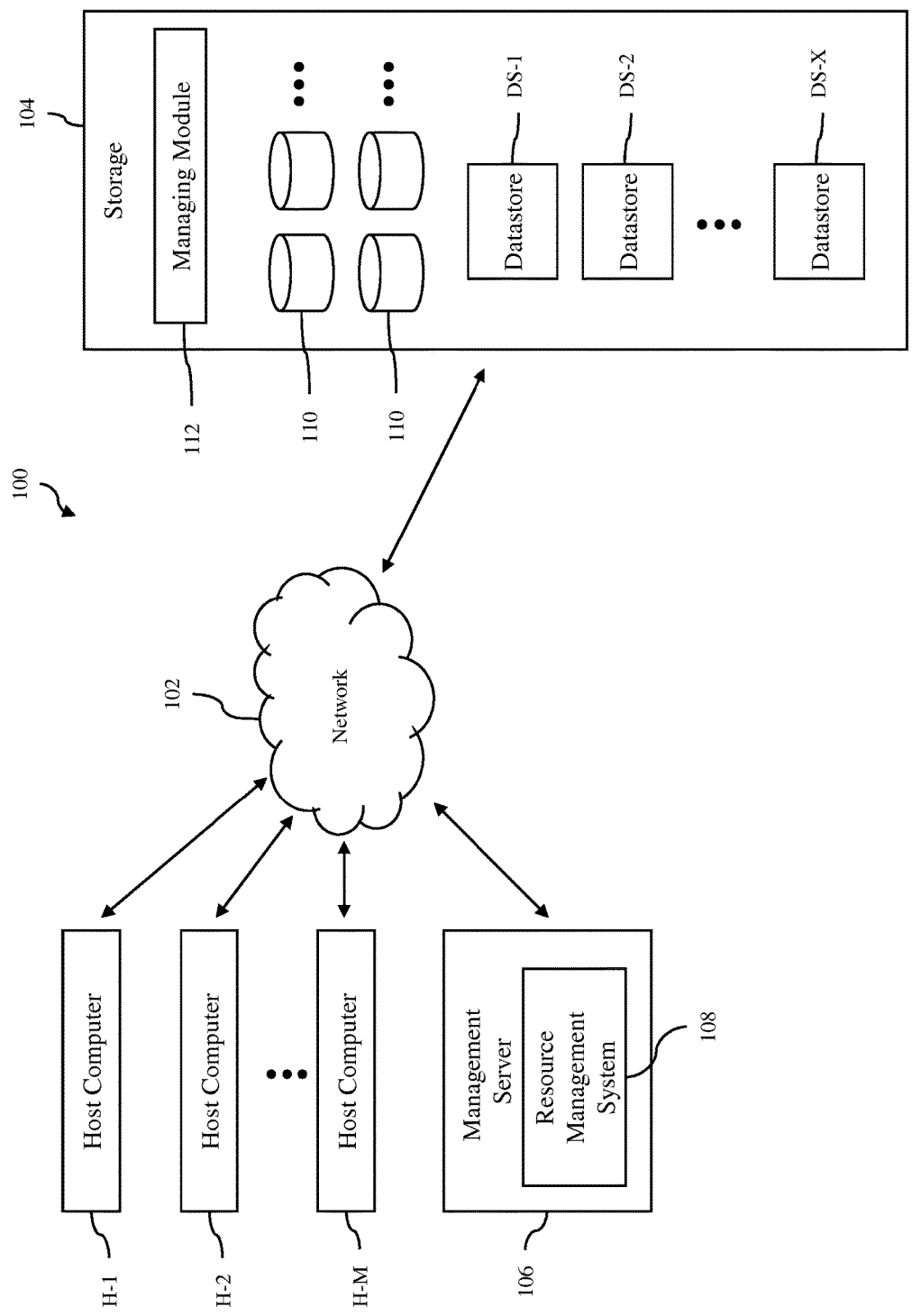
FIG. 1 is a block diagram of a distributed computer system in accordance with an embodiment of the invention.

Turning now to FIG. 1, a distributed computer system 100 in accordance with an embodiment of the invention is shown. As shown in FIG. 1, the distributed computer system includes a network 102, a number of host computers H-1, H-2 . . . H-M (where M is a positive integer), storage 104, a management server 106 with a resource management system 108. The host computers, the storage and the management server are connected to the network. Thus, each of the host computers is able to access the storage via the network and may share the resources provided by the storage with the other host computers. Consequently, any process running on any of the host computers may also access the storage via the network.

The host computers H-1, H-2 . . . H-M are physical computer systems that hosts or supports one or more clients so that the clients are executing on the physical computer systems. As used herein, the term "client" is any software entity that can run on a computer system, such as a software application, a software process or a virtual machine (VM). The host computers may be servers that are commonly found in datacenters. The host computers may be installed in multiple server racks in the same or different facilities.

Figure 2:
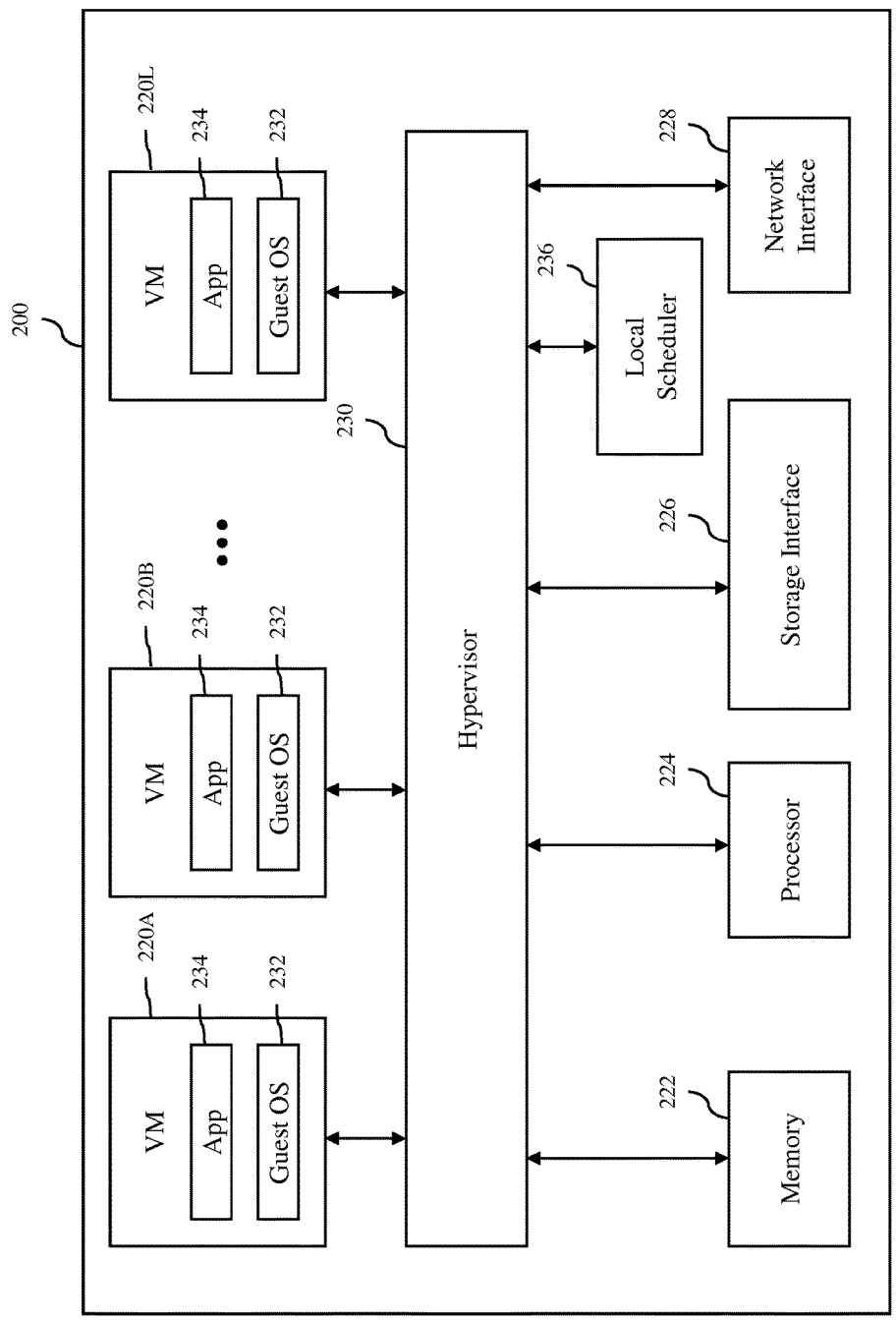
FIG. 2 is a block diagram of a host computer in accordance with an embodiment of the invention.

Turning now to FIG. 2, components of a host computer 200 that is representative of the host computers H-1, H-2 . . . H-M in accordance with an embodiment of the invention are shown. In FIG. 2, the physical connections between the various components of the host computer are not illustrated. In the illustrated embodiment, the host computer is configured to support a number of clients 220A, 220B . . . 220L (where L is a positive integer), which are VMs. The number of VMs supported by the host computer can be anywhere from one to more than one hundred. The exact number of VMs supported by the host computer is only limited by the physical resources of the host computer. The VMs share at least some of the hardware resources of the host computer, which include one or more system memories 222, one or more processors 224, a storage interface 226, and a network interface 228. Each system memory 222, which may be random access memory (RAM), is the volatile memory of the host computer. Each processor 224 can be any type of a processor, such as a central processing unit (CPU) commonly found in a server. The storage interface 226 is an interface that allows that host computer to communicate with the storage 104. As an example, the storage interface may be a host bus adapter or a network file system interface. The network interface 228 is an interface that allows the host computer to communicate with other devices connected to the network 102. As an example, the network interface may be a network adapter.

In the illustrated embodiment, the VMs 220A, 220B . . . 220L run on "top" of a hypervisor 230, which is a software interface layer that, using virtualization technology, enables sharing of the hardware resources of the host computer 200 by the VMs. However, in other embodiments, one or more of the VMs can be nested, i.e., a VM running in another VM. Any computer virtualization architecture can be implemented. For example, the hypervisor may run on top of the host computer's operating system or directly on hardware of the host computer. With the support of the hypervisor, the VMs provide isolated execution spaces for guest software. Each VM may include a guest operating system 232 and one or more guest applications 234. The guest operating system 232 manages virtual system resources made available to the corresponding VM by the hypervisor 230, and, among other things, the guest operating system forms a software platform on top of which the guest applications 234 run.

Similar to any other computer system connected to the network 102, the VMs 220A, 220B . . . 220L are able to communicate with each other using an internal software OSI Layer 2 switch (not shown) and with other computer systems connected to the network using the network interface 228 of the host computer 200. In addition, the VMs are able to access the storage 104 using the storage interface 226 of the host computer.

The host computer 200 also includes a local scheduler 236 that operates as part of a resource management system, such as VMware vSphere® Distributed Resource Scheduler™ (DRS) ("VMware vSphere" and "Distributed Resource Scheduler" are trademarks of VMware, Inc.), to manage resource requests made by the VMs 220A, 220B . . . 220L. Although the local scheduler is illustrated in FIG. 2 as being separate from the hypervisor 230, the local scheduler may be implemented as part of the hypervisor. In some embodiments, the local scheduler is implemented as one or more software programs running on the host computer. However, in other embodiments, the local scheduler may be implemented using any combination of software and hardware.

Turing back to FIG. 1, the network 102 can be any type of computer network or a combination of networks that allows communications between devices connected to the network. The network 102 may include the Internet, a wide area network (WAN), a local area network (LAN), a storage area network (SAN), a fibre channel network and/or other networks. The network 102 may be configured to support protocols suited for communications with storage arrays, such as Fibre Channel, Internet Small Computer System Interface (iSCSI), Fibre Channel over Ethernet (FCoE) and HyperSCSI.

The storage 104 is used to store data for the host computers H-1, H-2 . . . H-M, which can be accessed like any other storage device connected to computer systems. In an embodiment, the storage can be accessed by entities, such as clients running on the host computers, using any file system, e.g., virtual machine file system (VMFS) or network file system (NFS). The storage includes one or more computer data storage devices 110, which can be any type of storage devices, such as solid-state devices (SSDs), hard disks or a combination of the two. At least some of these storage devices may be local storage devices of the host computers, e.g., locally attached disks or SSDs within the host computers. The storage devices may operate as components of a network-attached storage (NAS) and/or a storage area network (SAN). The storage includes a storage managing module 112, which manages the operation of the storage. In an embodiment, the storage managing module is a computer program executing on one or more computer systems (not shown) of the storage. The storage supports multiple datastores DS-1, DS-2 ... DS-X (where X is a positive integer), which may be identified using logical unit numbers (LUNs). In an embodiment, the datastores are virtualized representations of storage facilities. Thus, each datastore may use the storage resource from more than one storage device included in the storage. The datastores are used to store data associated with the clients supported by the host computers. For virtual machines, the datastores may be used to store virtual storage, e.g., virtual disks, used by each of the virtual machines, as well as other files needed to support the virtual machines.

The management server 106 operates to monitor and manage the host computers H-1, H-2 ... H-M, including clients running on the host computers. As illustrated in FIG. 1, in an embodiment, the management server includes the resource management system 108, which can be enabled by a user, to perform resource management operations on the host computers, such as, but not limited to, resource allocation, load balancing and placement of clients on different host computers. As described in more detail below, the resource management system operates to automatically create affinity-type rules for various resources in the distributed computer system 100, which can increase performance of the clients running in the system. Affinity-type rules are described in detail below. In the illustrated embodiment, the resource management system is part of the management server. However, in other embodiments, the resource management system may be physically separate from the management server and situated external to the management server. Still, in other embodiments, the resource management system may be distributed among different components of the distributed computer system so that parts of the resource management system operate in different components, such as the management server and the host computers. The resource management system may be implemented in any combination of hardware and software. In a particular implementation, the resource management system may be implemented as software programs that are executed by one or more processors of the one or more physical computers that are supporting the resource management system, such as the processors of the management server.

In some embodiments, the management server 106 may be a physical computer, and thus, includes memory and one or more processors, as well as other components commonly found in a computer system. In other embodiments, the management server may be implemented as one or more software programs running on one or more physical computers, such as the host computer 200 shown in FIG. 2, or virtual computers, such as the 220A, 220B ... 220L. In an implementation, the management server is a VMware vCenter™ server with at least some of the features available for such a server, and some or all of the components of the resource management system 108 may be incorporated into VMware Distributed Resource Scheduler (DRS).

As mentioned above, the resource management system 108 can automatically create affinity-type rules for various resources in the distributed computer system 100. Affinity-type rules define how designated resources should be associated with each other. In general, affinity rules specify that designated resources should be connected to each other, while anti-affinity rules specify that designated resource should be disconnected from each other. The following are some common affinity-type rules for clients and host computers:

(1) Client-host affinity rules make a group of clients affine to a group of host computers. Under these rules, the clients in the group are only placed in one of the specified host computers, and are never moved to a host computer outside of this group of host computers.

(2) Client-host anti-affinity rules make a group of clients anti-affine to a group of host computers. Under these rules, the clients in the group are never placed in any of the host computers from the specified group.

(3) Client-client anti-affinity rules make a group of clients anti-affine to each other. Under these rules, no two clients in the specified group are placed in the same host computer.

(4) Client-client affinity rules make a group of clients affine to each other. Under these rules, the clients in the group are placed in the same host computer.

In some situations a group of clients or host computers may include only a single client or a single host computer. These affinity and anti-affinity rules may be soft or hard. If an affinity-type rule is a hard rule, then that rule must be followed, which means that if an operation is not possible without breaking the hard rule, then the operation cannot proceed. If an affinity-type rule is a soft rule, then that rule should be followed, which means that if an operation is not possible without breaking the soft rule, then the soft rule can be ignored and the operation is allowed to proceed without following the rule. Similar affinity-type rules can exist for other resources, such as storage and network resources.

In conventional resource management systems, the affinity-type rules are manually specified by administrators. However, since there can be hundreds or even thousands of clients running in a virtualized infrastructure, such as the distributed computer system 100, manually creating affinity-type rules for some of these clients can be a time-consuming process. In addition, as conditions or situations change over time in the virtualized infrastructure, affinity-type rules for various resources may need to be repeatedly changed in response to changes in conditions or situations.

In contrast, the resource management system 108 automatically creates affinity-type rules for resources under certain conditions, such as when a newly instantiated or powered-on client is placed in one of the host computers in the distributed computer system or when a new host computer is added to the distributed computer system. In addition, the resource management system automatically modifies existing affinity-type rules for resources under other conditions. Automatic creation and modification of affinity-type rules by the resource management system are described in more detail below.

Figure 3:
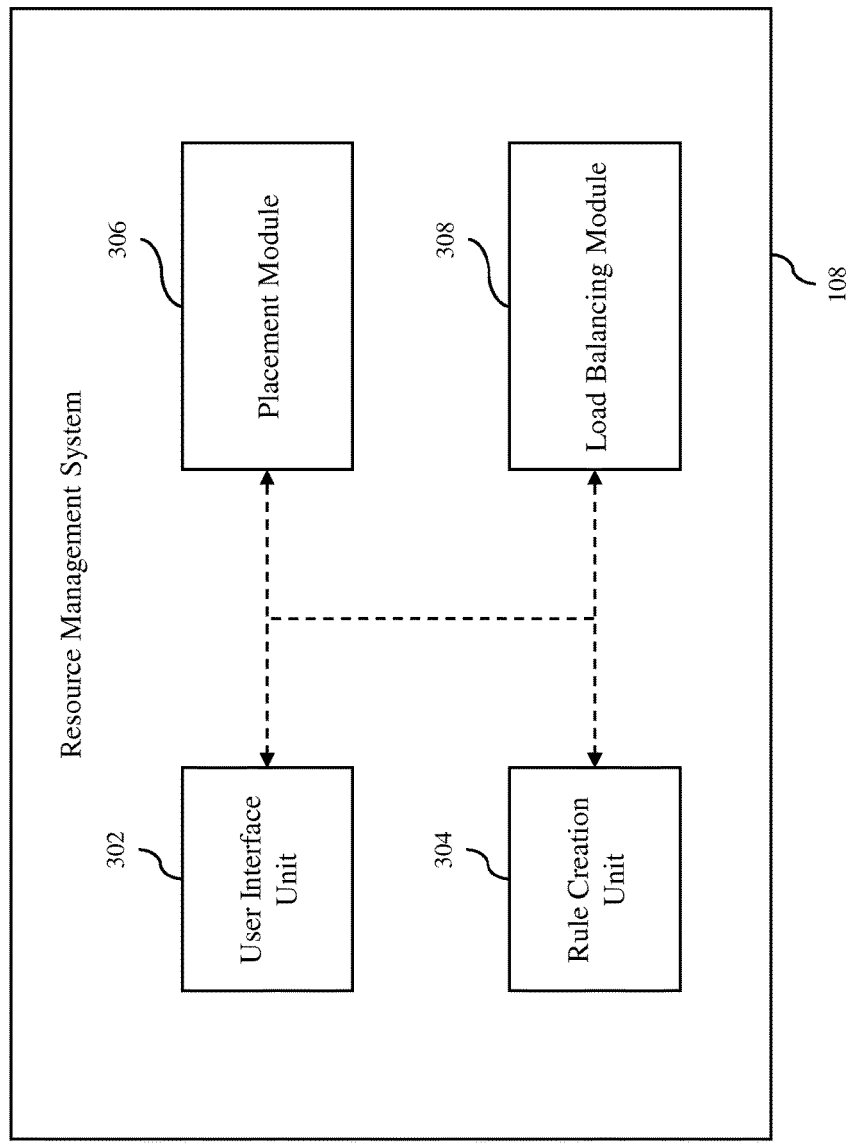
FIG. 3 is a block diagram of a resource management system included in the distributed computer system in accordance with an embodiment of the invention.

Turning now to FIG. 3, components of the resource management system 108 in accordance with an embodiment of the invention are shown. As illustrated in FIG. 3, the resource management system includes a user interface unit 302, a rule creation unit 304, a placement module 306 and a load balancing module 308. These components of the resource management system may be implemented in any combination of hardware, software and firmware. In one implementation, these components of the resource management system are implemented as one or more software programs running in the management server 106 using one or more processors associated with or installed in the management server. In other implementations, these components of the resource management system are implemented as one or more software programs running on different devices in the distributed computer system 100 using one or more processors associated with or installed in the different devices.

The user interface unit 302 of the resource management system 108 operates to allow a user, such as an administrator of the distributed computer system 100, to interact with the resource management system. The user interface unit allows the user to input data into the resource management system. In particular, the user interface unit allows the user to input information that is used by the rule creation unit 304, as described below. The user interface unit also allows the user to implement any recommendations made by the placement module 306 and the load balancing module 308. The user interface unit may provide one or more graphical user interfaces for a user to input data using any input mechanism, such as a keyboard or a touchscreen monitor connected to the management server 106.

The rule creation unit 304 of the resource management system 108 operates to automatically generate affinity-type rules for resources in the distributed computer system 100. That is, the rule creation unit generates affinity-type rules for resources without explicit specifications from an administrator to create the affinity-type rules. Explicit specifications may involve an administrator using a graphical user interface to select each of the resources being considered for a single affinity-type rule. The rule creation unit creates affinity-type rules without having an administrator perform these manual operations to explicitly create affinity-type rules.

The rule creation unit 304 may generate affinity-type rules using resource association inferences based on information derived from one or more sources, such as the placement module 306, without human intervention with respect to the generation of the inference information and the generation of the affinity-type rules. However, in some cases, inference information may be manually provided by an administrator via the user interface unit 302. When association inference information for a resource is received, the rule creation unit analyzes the information and determines any resource association between that resource and any other resource or resources in the distributed computer system 100. There are various information that can indicate resource associations to automatically generate affinity-type rules. As an example, operational characteristics of a new client, i.e., latency sensitivity of a VM, being placed may be used to infer association of the client to one or more host computers. As another example, the physical location of a host computer into which a new client is being placed may be used to infer association of the client to that physical location. The type of information used to create affinity-type rules can vary depending on different use scenarios. The rule creation unit may be configurable to recognize select use scenarios so that an administrator can control the affinity-type rules that are automatically created by the rule creation unit, as well as the type of information being used to create those rules. Some of these use scenarios that can be recognized by the rule creation unit will be described below.

The placement module 306 of the resource management system 108 operates to determine the initial placements of new clients in the host computers H-1, H-2 . . . H-M and the placements of virtual disks for the new clients in the datastores DS-1, DS-2 . . . DS-X. In an embodiment, the placement module selects a host computer among all possible host computers in the distributed computer system 100 that can support a client to be placed and a datastore connected to the selected host computer for client placement. The placement module searches for suitable host computers in the distributed computer system that can satisfy the resource requirements of a client to be placed, such as CPU, RAM, network and storage resources, and any policy requirements for the client to be placed, such as affinity and anti-affinity rules. In selecting one of the suitable host computers to place the client, the placement module considers current resource utilization metrics of the host computers, i.e., how much resources are being utilized at the host computers. When considering storage utilization metrics, the placement module determines the best datastore connected to each suitable host computer. When a suitable host computer is selected for the client, the best datastore connected to that host computer is also selected for the client.

In some embodiments, the placement module 306 ranks the suitable host computers using the resource utilization metrics. As an example, a suitable host computer with low CPU utilization metrics may be ranked higher than a suitable host computer with higher CPU utilization metrics. The top ranked host computer can then be presented to an administrator for approval, which can be made via a graphical user interface provided by the user interface unit 302. In other embodiments, the new client can be automatically placed in the top ranked host computer without approval by an administrator.

In some embodiments, the placement module 306 provides resource association inference information to the rule creation unit 302 so that affinity-type rules can be generated based on that information. In an embodiment, the resource association inference information may be geographical preference for a new client being placed in the distributed computer system 100. In this embodiment, the host computers H-1, H-2 . . . H-M in the distributed computer system are located in different geographical locations, which may be defined by any geographical areas, such as countries or regions, which may be parts of countries, e.g., Western United States (US-West) and Eastern United States (US-East), or regions comprising multiple countries, e.g., Western Europe, Eastern Europe and Asia-Pacific (APAC) region. When a new client is being placed in the distributed computer system, the placement module may present an option to an administrator to select a desired geographical location from a list of possible geographical locations, for example, using a graphical user interface provided by the user interface unit 302. Once a geographical location has been selected by the administrator, the placement module will limit the search of a host computer and a datastore to place the new client to the selected geographical location. In this embodiment, the resources, including host computers and datastores, in the distributed computer system have been tagged with geographical information.

The tagging of resources with geographical information can be achieved by manual processes. In these processes, when a resource is connected to or otherwise made available in the distributed computer system 100, an administrator will be asked to enter the geographical location for that resource, for example, via a graphical user interface provided by the user interface unit 302. Once the graphical location has been entered, the resource is tagged with the provided geographical location.

Figure 4:
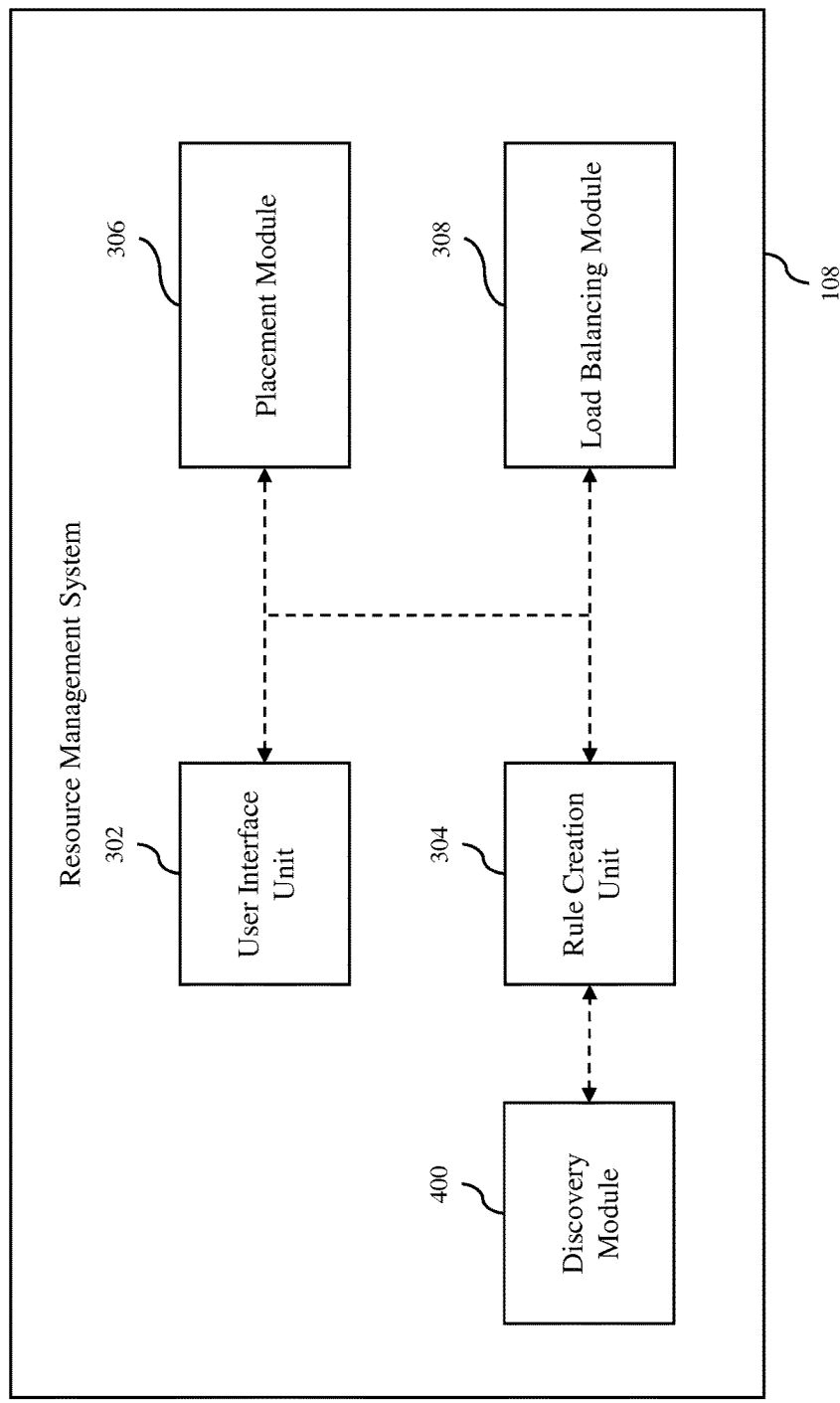
FIG. 4 is a block diagram of the resource management system in accordance with another embodiment of the invention.

The tagging of resources with geographical information can also be achieved by automatic processes. In these processes, when a resource is connected to or otherwise made available in the distributed computer system, a discovery module will extract non-geographical information that indicates the geographical location of the resource. Once the graphical location of the resource has been determined using the extracted information, the resource is tagged with that geographical location by the discovery module. Such a discovery module may be included in the resource management system 108, as illustrated in FIG. 4. However, in other embodiments, the discovery module 400 shown in FIG. 4 may be located in another component of the distributed computer system 100 or distributed in multiple components of the distributed computer system.

The non-geographical information that indicates the geographical location of a resource can vary from resource to resource. For example, for a host computer being added to the distributed computer system 100 supported by the management server 106, the discovery module can execute an auto-discovery process of the Internet Protocol (IP) address range for the host computer. This IP address range is maintained by the management server 106. Using the discovered IP address range, the discovery then determines the geographical location associated with the IP address range. The discovery module can then tag the host computer with the determined geographical location. As an example, a tag indicating the determined geographical location can be added to the host computer name itself, e.g., an ESXi host name. This geographical location information of the host computer can then be used by the placement module 306 when the selected geographical location of a new client being placed in the distributed computer system is the same geographical location of the host computer.

In addition to selecting a host computer in the selected geographical location for a client being placed, the placement module 306 also provides information to the rule creation unit 304 so that a client-host affinity rule can be automatically created or modified by the rule creation unit. The client-host affinity rule may be either soft or hard rule as predefined by a default setting of the rule creation unit or as manually set by an administrator. If the client being placed is the first client with this geographical location preference, then a new client-host affinity rule will be created by the rule creation unit in which the client is associated with a group of host computers that are tagged with the selected geographical location. When a subsequent client with the same geographical preference is placed, the existing client-host affinity rule is updated by the rule creation unit to include that subsequent client. The client-host affinity rule ensures that the clients that belong to the rule will always remain at the geographical location even when the clients are rebooted or migrated to another host computer in the geographical location due to load balancing or other resource management operations.

There are many reasons to maintain a group of clients in a particular geographical location. One reason is that moving one or more of the clients outside of that geographical location can have an adverse impact on the performance of services running on that client, which can hurt the business associated with those services. Another reason may be that services being provided by the clients in the group are not allowed to be performed outside of that geographical location due to law, rules or regulations of one or more countries within that geographical location. Thus, to be in compliance, the clients would need to be limited to the geographical location.

In some situations, there may be a need to exclude a group of clients to a particular geographical location. In these situations, a client-host anti-affinity rule based on geographical locations may be automatically created by the rule creation unit 304. The process of creating a client-host anti-affinity rule based on geographical locations is similar to the process of creating a client-host affinity rule based on geographical locations, as described above.

When a new client is being placed in the distributed computer system 100, the placement module 306 may present an option to an administrator to select one or more undesirable geographical locations from a list of possible geographical locations, for example, using a graphical user interface provided by the user interface unit 302. Once one or more undesirable geographical locations have been selected by the administrator, the placement module will limit the search of a host computer and a datastore to place the new client to other geographical locations, i.e., geographical locations other than the selected geographical locations. It is assumed here that the resources, including host computers and datastores, in the distributed computer system 100 have been tagged with geographical information in one of the manners described above.

In addition to selecting a host computer in a geographical location other than the selected geographical locations for a client being placed, the placement module 306 also provides information to the rule creation unit 304 so that a client-host anti-affinity rule can be automatically created or modified by the rule creation unit. The client-host anti-affinity rule may be either soft or hard rule as predefined by a default setting of the rule creation unit or as manually set by an administrator. If the client being placed is the first client with this geographical location preference, then a new client-host anti-affinity rule will be created by the rule creation unit in which the client is associated with a group of host computers that are tagged with the selected geographical locations. When a subsequent client with the same geographical preference is placed, the existing client-host anti-affinity rule is updated by the rule creation unit to include that subsequent client. The client-host anti-affinity rule ensures that the clients that belong to the rule will always remain at other geographical locations, i.e., geographical locations other than the selected geographical locations even when the clients are rebooted or migrated to another host computer due to load balancing or other resource management operations.

In another embodiment, the resource association inference information provided by the placement module 306 may be non-migration preference for a new client being placed in the distributed computer system 100. As an example, for latency-sensitive clients and clients using vFlash Cache, it may be desirable to maintain these clients in their original host computers as much as possible. Thus, for these types of clients, after the clients have been placed in host computers, the placement module will transmit information regarding the clients and the host computers in which the clients were placed to the rule creation unit 304. In response, the rule creation unit will analyze the information to determine whether these clients have resource associations with their current host computers. The parameters for determining these types of resource associations may be programmed into the rule creation unit or may be manually entered into the rule creation unit by an administrator, for example, via a graphical user interface provided by the user interface unit 302. After the resource associations have been determined, the rule creation unit creates a client-host affinity rule for each of these clients. These affinity rules may be soft rules so that the clients will not be moved unnecessarily. In some embodiments, these clients may be tagged with information in their shipping product so that the rule creation unit can extract the tagged information to create the desired client-host affinity rules.

The load balancing module 308 of the resource management system 108 performs load balancing operations on the host computers H-1, H-2 . . . H-M in the distributed computer system 100. The load balancing module may move or migrate some of the clients running in the distributed computer system from their current host computers to other host computers in the distributed computer system to achieve better load balance. Thus, the load balancing module may place one or more clients running on host computers in the distributed computer system 100 in different host computers in the distributed computer system. The load balancing module performs load balancing operations while taking into consideration existing affinity-type rules for at least some of the clients running in the distributed computer system. These existing affinity-type rules includes rules automatically created by the rule creation unit 304, as well as any rules manually created by an administrator. Depending on whether the affinity-type rules are hard or soft, the load balancing module will strictly adhere to the rules (hard) or try to adhere to the rules (soft). In the case of geographical preference, the affinity-type rules ensure that certain clients remain at their current geographical location or never migrated to select geographical locations. In the case of non-migration preference, the affinity-type rules ensures that certain clients are not migrated unnecessary to other host computers.

Although not shown, the resource management system 108 may include other resource management modules that execute other resource management operations with consideration of existing affinity-type rules for at least some of the clients running in the distributed computer system. These existing affinity-type rules includes rules automatically created by the rule creation unit 304, as well as any rules manually created by an administrator.

In some embodiments, the resource management system 108 may allow an administrator to create new conditions, which results in affinity-type rules being created by the rule creation unit 304. As an example, an administrator may want clients running in a group of host computers in a particular server rack or in a particular blade enclosure to remain in those domains for various reasons, including performance and/or availability. In this example, rather than manually creating an affinity rule by specifying all the clients and the host computers, the administrator may simply select a group of host computers in a particular server rack or in a particular blade enclosure and indicate a desire to create a client-host affinity rule, for example, using a graphical user interface provided by the user interface unit 302, without having to select all the clients running on the host computers. In response, the rule creation unit creates a client-host affinity rule for the group of host computers and all the clients currently running on those host computers. This affinity rule may be a hard or soft rule. Thus, the clients running on the host computers of the specified group will always remain on the host computers of the specified group if the affinity rule is a hard rule or preferably remain on the host computers of the specified group if the affinity rule is a soft rule. Other conditions may be specified by an administrator that results in automatic creation of affinity-type rules for clients and host computers, or other resources in the distributed computer system.

Although the automatic creation of affinity-type rules by the resource management system 108 have been mostly described herein with respect to clients, e.g., VMs, and host computers, the resource management system can automatically create affinity-type rules for any other resources, such as storage and network resources. Some of these affinity-type rules for other resources may be automatically created in manners similar to those described above with respect to clients and host computers.

Figure 5:
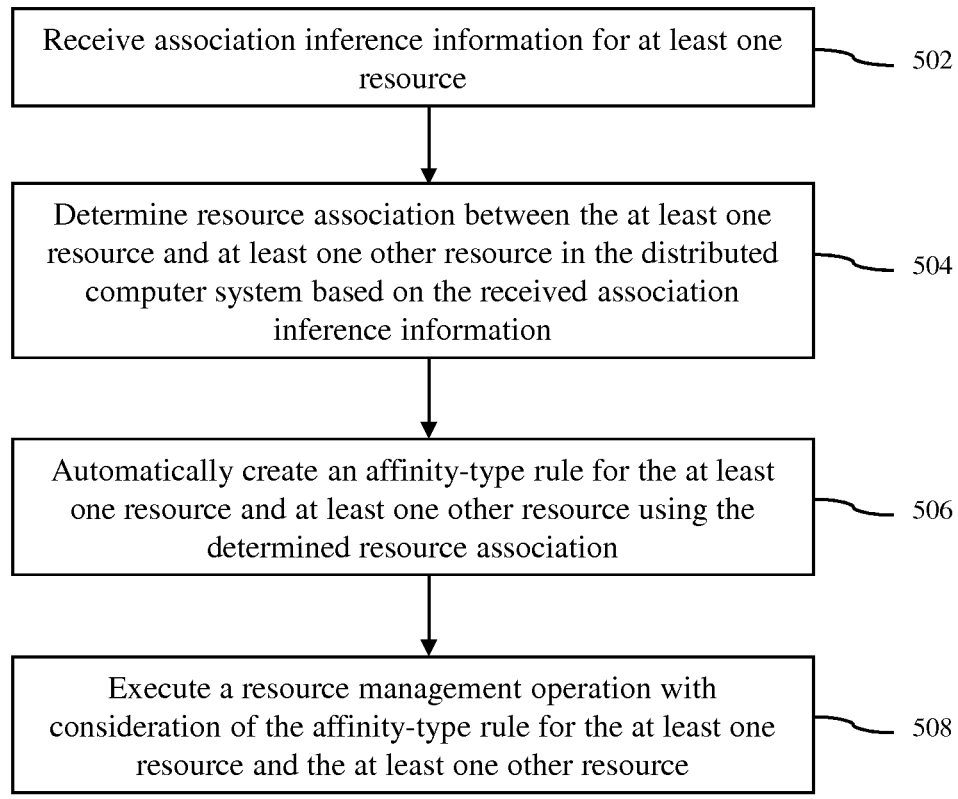
FIG. 5 is a flow diagram of a method for automatically creating affinity-type rules for resource management in a distributed computer system in accordance with an embodiment of the invention.

A method for automatically creating affinity-type rules for resource management in a distributed computer system in accordance with an embodiment of the invention is described with reference to a flow diagram of FIG. 5. At block 502, association inference information for at least one resource is received. At block 504, resource association between the at least one resource and at least one other resource is determined based on the received association inference information. At block 506, an affinity-type rule for the at least one resource and at least one other resource is automatically created using the determined resource association. At block 508, a resource management operation is executed with consideration of the affinity-type rule for the at least one resource and the at least one other resource.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for automatically creating affinity-type rules for resource management in a distributed computer system, the method comprising:

selecting, by a resource management system of the distributed computer system, a host computer of the distributed computer system on which a client will be initially placed;

upon selecting the host system on which the client will be initially placed, determining, by the resource management system, association inference information for the client, wherein the association inference information includes a geographic preference for the client;

determining, by the resource management system, a resource association between the client and one or more other resources in the distributed computer system based on the association inference information, wherein the one or more other resources including one or more other clients or host systems in the distributed computer system, wherein the one or more other resources are tagged with geographical information, and wherein the resource association includes a geographical association between the client and a geographic location for the one or more other resources based on the geographic preference and the geographical information; and automatically creating, by the resource management system, an affinity-type rule for the client and the one or more other resources using the determined resource association, wherein the affinity-type rule specifies that the client and the one or more other resources should be connected to each other or disconnected from each other, and wherein the resource management system performs future resource management operations in the distributed computer system with respect to the client or the one or more other resources based on the affinity-type rule.

2. The method of claim 1, wherein the tagging the one or more other resources in the distributed computer system with the geographical information includes receiving manual input of the geographical information for the one or more other resources in the distributed computer system.

3. The method of claim 1, wherein the tagging the one or more other resources in the distributed computer system with the geographical information includes automatically discovering the geographical information for the one or more other resources in the distributed computer system using non-geographical information that indicates the geographical information for the one or more other resources.

4. The method of claim 3, wherein the non-geographical information includes an Internet Protocol address range for a host computer that indicates a geographical location of the host computer.

5. The method of claim 1, wherein the association inference information includes a non-migration preference for the client and the resource association includes an association between the client and the host computer, and wherein the automatically creating the affinity-type rule includes automatically creating a client-host affinity rule for the client and the host computer.

6. The method of claim 1, wherein the determining the association inference information includes determining a selection of a group of host computers in a server rack or a blade enclosure, and wherein the automatically creating the affinity-type rule includes automatically creating a client-host affinity rule for the host computers in the group and any clients running on the host computers in the group.

7. The method of claim 1, wherein the future resource management operations include a load balancing operation.

8. A non-transitory computer-readable storage medium having stored thereon program instructions for automatically creating affinity-type rules for resource management in a distributed computer system, wherein execution of the program instructions by one or more processors of a computer system causes the one or more processors to perform steps comprising:

selecting a host computer of the distributed computer system on which a client will be initially placed;

upon selecting the host system on which the client will be initially placed, determining association inference information for the client, wherein the association inference information includes a geographic preference for the client;

determining a resource association between the client and one or more other resources in the distributed computer system based on the association inference information, wherein the one or more other resources including one or more other clients or host systems in the distributed computer system, wherein the one or more other resources are tagged with geographical information, and wherein the resource association includes a geographical association between the client and a geographic location for the one or more other resources based on the geographic preference and the geographical information; and automatically creating an affinity-type rule for the client and the one or more other resources using the determined resource association, wherein the affinity-type rule specifies that the client and the one or more other resources should be connected to each other or disconnected from each other, and wherein the computer system performs future resource management operations in the distributed computer system with respect to the client or the one or more other resources based on the affinity-type rule.

9. The non-transitory computer-readable storage medium of claim 8, wherein the tagging the one or more other resources in the distributed computer system with the geographical information includes receiving manual input of the geographical information for the one or more other resources in the distributed computer system.

10. The non-transitory computer-readable storage medium of claim 8, wherein the tagging the one or more other resources in the distributed computer system with the geographical information includes automatically discovering the geographical information for the one or more other resources in the distributed computer system using non-geographical information that indicates the geographical information for the one or more other resources.

11. The non-transitory computer-readable storage medium of claim 10, wherein the non-geographical information includes an Internet Protocol address range for a host computer that indicates a geographical location of the host computer.

12. The non-transitory computer-readable storage medium of claim 8, wherein the association inference information includes a non-migration preference for the client and the resource association includes an association between the client and the host computer, and wherein the automatically creating the affinity-type rule includes automatically creating a client-host affinity rule for the client and the host computer.

13. The non-transitory computer-readable storage medium of claim 8, wherein the determining the association inference information includes determining a selection of a group of host computers in a server rack or a blade enclosure, and wherein the automatically creating the affinity-type rule includes automatically creating a client-host affinity rule for the host computers in the group and any clients running on the host computers in the group.

14. The non-transitory computer-readable storage medium of claim 8, wherein the future resource management operations include a load balancing operation.

15. A computer system comprising:
a processor; and
a non-transitory computer readable medium having stored thereon program code for automatically creating affinity-type rules for resource management in a distributed computer system, the program code causing the processor to:
select a host computer of the distributed computer system on which a client will be initially placed;
upon selecting the host system on which the client will be initially placed, determine association inference information for the client, wherein the association inference information includes a geographic preference for the client;
determine a resource association between the client and one or more other resources in the distributed computer system based on the association inference information, wherein the one or more other resources including one or more other clients or host systems in the distributed computer system, wherein the one or more other resources are tagged with geographical information, and wherein the resource association includes a geographical association between the client and a geographic location for the one or more other resources based on the geographic preference and the geographical information; and
automatically create an affinity-type rule for the client and the one or more other resources using the determined resource association, wherein the affinity-type rule specifies that the client and the one or more other resources should be connected to each other or disconnected from each other, and wherein the computer system performs future resource management operations in the distributed computer system with respect to the client or the one or more other resources based on the affinity-type rule.

16. The computer system of claim 15, wherein the program code further causes the processor to:
automatically discover geographical information for the one or more other resources in the distributed computer system using non-geographical information that indicates the geographical information for the one or more other resources.

17. The computer system of claim 16, wherein the non-geographical information includes an Internet Protocol address range for a host computer that indicates a geographical location of the host computer.

18. The computer system of claim 15, wherein the association inference information includes a non-migration preference for the client and the resource association includes an association between the client and the host computer, and wherein a client-host affinity rule is created for the client and the host computer.

19. The computer system of claim 15, wherein the program code further causes the processor to:
receive a selection of a group of host computers in a server rack or a blade enclosure; and
automatically create a client-host affinity rule for the host computers in the group and any clients running on the host computers in the group.

20. The computer system of claim 15, wherein the future resource management operations include a load balancing operation.

* * * * *